Dec. 22, 1953  H. BERKOVITZ  2,663,387
ELEVATOR BRAKE

Filed Sept. 2, 1950  2 Sheets-Sheet 1

WITNESSES:
Wm. B. Sellers.
Nw. C. Groome.

INVENTOR
Harry Berkovitz.
BY
ATTORNEY

Dec. 22, 1953  H. BERKOVITZ  2,663,387
ELEVATOR BRAKE

Filed Sept. 2, 1950  2 Sheets-Sheet 2

WITNESSES:

INVENTOR
Harry Berkovitz.
BY
ATTORNEY

Patented Dec. 22, 1953

2,663,387

UNITED STATES PATENT OFFICE 2,663,387

ELEVATOR BRAKE

Harry Berkovitz, Weehawken, N. J., assignor to Westinghouse Electric Corporation, East Pittsburgh, Pa., a corporation of Pennsylvania Application September 2, 1950, Serial No. 182,949

8 Claims. (Cl. 188—171)

The present invention relates to electric elevators and more particularly to a refined control for the stopping operation of the elevators.

With modern passenger elevators operating at speeds of from 600 to 1400 feet per minute, the demands for increased accuracy of landing at floor level and speed of landing are becoming more acute. The use of roller guide-shoes is becoming more common and in view of their low frictional grip on the guide rails, they have a low damping effect upon the movement of the elevator car. Also, it is becoming increasingly necessary to eliminate or minimize noise vibration incident to stopping, and of course the stop must be made as quickly as possible consistant with the comfort of the passengers.

Comfortable and accurate stops with present brake mechanisms on the elevator machine make it necessary to resort to close tolerances of the moving parts of the brake, which becomes expensive both as to manufacture and maintenance. Refinements in the control circuits of the elevator are becoming increasingly complicated in attempting to obtain greater accuracy of stopping level with the landing, and many variations in control circuits for the electromagnet of the brake are being resorted to involving combinations of resistors and rectifiers in order to more accurately control the application of the brake. Revisions have also been required in the design of the coils and the magnetic circuit of the brake and even attempts have been made to obtain lower landing speeds which involve further complications in the elevator control circuit.

In accordance with the present invention, an elevator brake of the spring-actuated and magnetically-released type is provided in which, upon deenergizing of the brake magnet, the spring will force the brake shoe in engagement with the brake drum with a force which is effectively varied in decreasing amounts as the brake shoe takes effect to bring the car to a stop.

It is an object of the present invention to provide a brake in which the braking force is varied in decreasing increments as the brake takes effect.

It is a further object of the invention to provide a spring-actuated brake in which the effect of the spring is decreased slightly just before the brake becomes effective.

It is a further object of the invention to provide a spring-actuated magnetically-released brake for an elevator hoisting motor in which means is provided for varying the application of the braking force in the stopping operation of the machine.

Other objects of the invention will be apparent from the following description and the accompanying drawings, in which.

Figure 1:
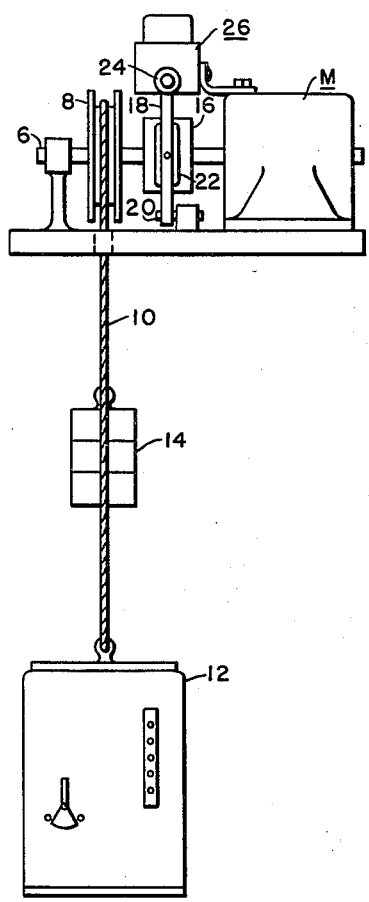
Figure 1 is a schematic showing of an elevator car and its hoisting machine to which the invention is applicable.

Referring to the drawings and particularly Fig. 1, an elevator motor M drives through a shaft 6 a hoisting sheave 8 around which passes a hoisting cable or roping 10, one end of which is secured to an elevator car 12 and the other to a suitable counterweight 14.

The shaft 6 is provided with a brake drum 16 with which cooperate a pair of brake levers 18 (only one being shown in Fig. 1) each of which is pivoted as at 20 and carries a brake shoe 22.

Figure 2:
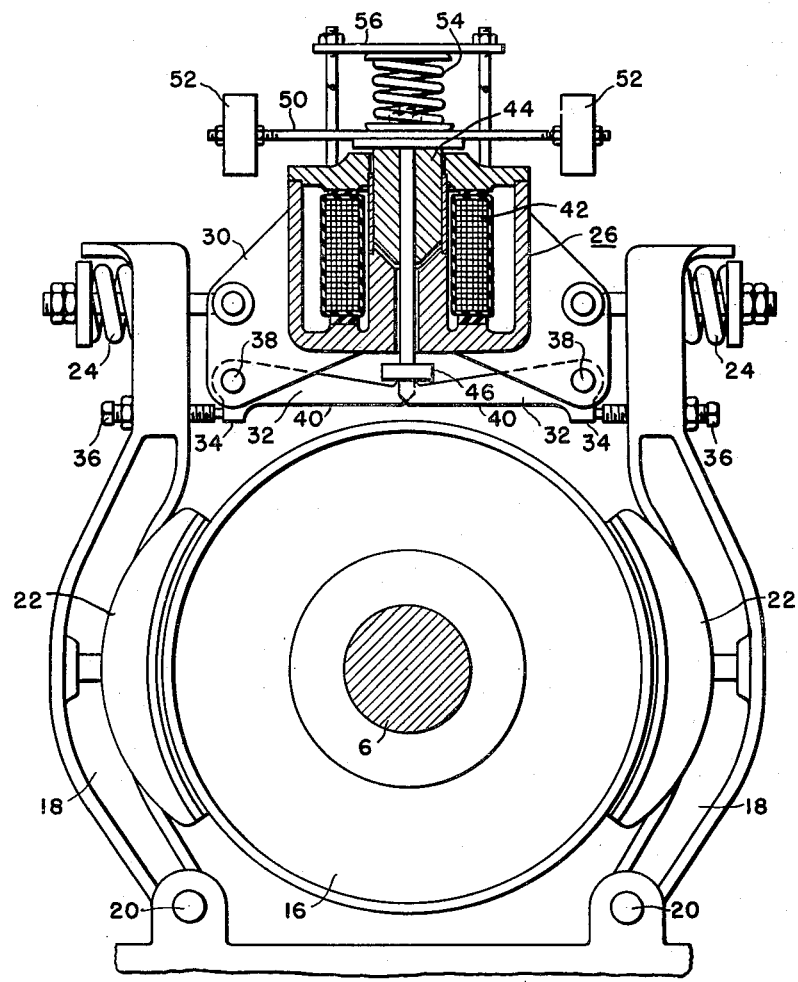
Fig. 2 is an enlarged view of an elevator brake of the type indicated in Fig. 1, and Fig. 3 comprises a series of curves explanatory of the operations of the present invention.

The upper ends of the levers 18 are controlled by coil springs 24 and an electromagnet 26, as more clearly illustrated in Fig. 2.

Referring to Fig. 2, it will be noted that the brake arms 18 pivoted at their lower ends at 20 are each engaged by a coil spring 24 which reacts against a stationary portion 30 of the elevator machine to tend to force the two arms 18 toward each other and thereby force the brake shoes 22 against the surface of the brake drum 16. The force exerted is sufficient to bring the brake drum and the shaft 6 to rest under normal conditions.

A brake releasing lever 32 is provided for each of the brake arms 18 and includes a relatively short lever arm 34 which bears against an adjustable stop 36, and a substantially longer lever arm 40. Each lever 32 is pivoted at 38 on the stationary portion 30 of the elevator machine.

In order to release the brake shoes 22 it is necessary to depress the levers 40 which, acting through the lever arms 34, move the brake arms outwardly against the force of the springs 24. This may be accomplished by electromagnet 26 which includes a solenoid winding 42 and an armature or plunger 44 having a lower extension 46 which engages the free ends of the levers 40.

Upon energization of the winding 42 the plunger is pulled downwardly and forces the ends of the levers 40 in that direction thereby moving the upper ends of the brake arms 18 outwardly against the forces of the springs 24. So long as the magnet winding 42 is energized, which is during normal running of the car, the brake shoes are maintained released. When it is desired to make a stop the elevator control circuit will effect the deenergization of the winding 42 at the proper point in the travel of the car, and the magnet plunger will rise permitting the free end of each of the levers 40 to also rise and the brake shoes to be applied to the brake drum 16 under the influence of the springs 24. It is an object of the present invention to properly control such brake application.

On the top of armature or plunger 44 of the brake magnet, there is clamped a spring bar 50 having at opposite ends thereof weights 52 of such value that they will have substantial inertia as compared to the solenoid plunger 44. Upon the upward movement of the plunger 44, therefore, the inertia weights 52 will first slightly lag such movement and then upon recovery of the spring bar 50 they may then lead such movement and oscillate with decreasing amplitude as the plunger 44 comes to its final position. This oscillation of course reacts upon the movement of the plunger 44, and accordingly upon the ends of the actuating levers 40, thereby successively varying the effective force of the springs 24 as the brake shoes are being applied.

It will be noted that although the reaction of the oscillating weights on the plunger 44 may not be great, the reaction is amplified in its effect on the springs 24 by reason of the high lever arm ratio between the lever arms 40 and 34.

A coil spring 54 may be used to center the plunger 44 and is retained in operative position by a suitable arbor 56. The spring 54 is effective to slightly damp the action of the inertia weights 52, and accordingly the movement of the plunger 44, to prevent a possible tendency for the plunger to jump when the weights suddenly overtake and lead the plunger movement. Of course, the weights 52 will be of a proper value to obtain the action desired depending upon the design constants of the magnet plunger and braking system, and may be moved along the spring bar 50 as desired to increase or decrease the effective lever length of the bar.

Figure 3:
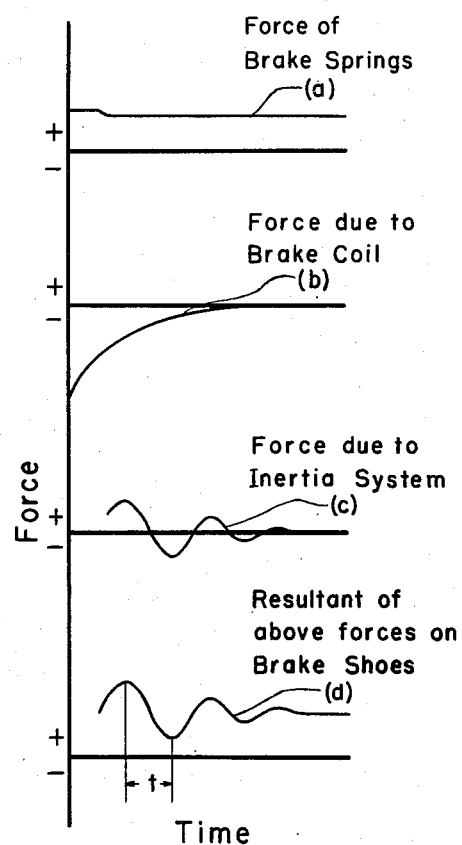

The effect of the oscillatory system defined by the weights 52 may be more readily understood by reference to Fig. 3. When the electromagnet 42 is deenergized, the brake will be applied rather suddenly and the force thereof may be represented by the curve (a) in which a slight break occurs very quickly as the brake shoes are applied, and a constant positive braking force continues thereafter until the car comes to rest.

On the other hand, there is a negative force which decays quite rapidly due to the decay of magnetic flux in the winding 42 and the magnetic circuit. This is represented in curve (b).

The force due to operation of the inertia system is represented in curve (c) wherein it is noted that the force is oscillatory in character and decays quite rapidly as the brake is applied.

The resultant of these three forces as represented by curves (a), (b) and (c) is shown in curve (d) illustrating how the braking force increases and decreases in an oscillatory manner, although the resultant of the three above-mentioned forces is always on the positive or brake-applying side of the axis. It is contemplated that after the brake applying force reaches a maximum it then decreases substantially and then increases after the car comes to a stop. In the period represented by the distance $t$ (about .375 sec.), a relatively comfortable period is afforded for the car to reach zero velocity.

In accordance with the invention, a smooth braking action on an elevator is provided in which the initial abrupt application of the brake is slightly relieved and then reapplied as the elevator car comes to rest. It is well known that in the application of brakes manually in vehicles of various types, this kind of braking action affords the most comfortable stop. It is quite common practice in the case of a motor vehicle to apply the brakes to bring the vehicle almost to a stop and then slightly release the braking pressure periodically in coming to a final smooth stop.

Quite obviously modifications of the specific example illustrated and described herein will present themselves to those skilled in the art, and it is desired that the invention be limited only by the spirit and scope thereof.

I claim as my invention:

1. In a brake including a brake shoe and a spring for biasing it against a braking surface in brake-applying relation, means for releasing said brake comprising a pivoted lever having an arm movable in opposition to the bias of said spring and an elongated operating arm, an electromagnet having a core member movable when said electromagnet is energized to engage said operating arm to release the brake, and movable in the opposite direction upon deenergization of said electromagnet to permit application of said brake, and means exerting an oscillatory force on the core in its movement in said opposite direction to periodically vary the biasing effect of said spring.

2. In a spring-actuated magnetically-releasable brake including a brake drum, a brake shoe for for cooperation therewith and resilient means biasing said shoe against said drum in brake-applying relation, an electromagnet having a movable core and means controlled thereby when said electromagnet is energized and acting against said resilient means for releasing said brake shoe, and means operative when said electromagnet is deenergized for imposing an oscillatory force on the force exerted by said resilient means in applying said brake shoe.

3. A brake including a brake drum, a brake shoe and a spring for normally forcing said shoe against said drum in brake-applying engagement, means including an electromagnet having a core movable in one direction for exerting a force in opposition to said spring to release said brake-applying engagement when said electromagnet is energized and movable in the opposite direction under the influence of said spring when the electromagnet is deenergized, and means for controlling the movement of said core in said opposite direction to impose a periodically varying opposing force on the brake-applying force of said spring.

4. A brake including a brake drum, a brake shoe and a spring for normally forcing said shoe against said drum in brake-applying engagement, means including an electromagnet having a core movable in one direction for exerting a force in opposition to said spring to release said brake-applying engagement when said electromagnet is energized and movable in the opposite direction under the influence of said spring when the electromagnet is deenergized, and means for controlling the movement of said core in said opposite direction to impose a periodically varying opposing force on the brake-applying force of said spring, said last-named means including an inertia responsive device operated in accordance with core movement.

5. A brake including a brake drum, a brake shoe and a spring for normally forcing said shoe against said drum in brake-applying engagement, means including an electromagnet having a core movable in one direction for exerting a force in opposition to said spring to release said brake-applying engagement when said electromagnet is energized and movable in the opposite direction under the influence of said spring when the electromagnet is deenergized, and means for controlling the movement of said core in said opposite direction to impose a periodically varying opposing force on the brake-applying force of said spring, said last-named means including a weight member resiliently mounted on said core for movement therewith.

6. A brake including a brake drum, a brake shoe and a spring for normally forcing said shoe against said drum in brake-applying engagement, means including an electromagnet having a core movable in one direction for exerting a force in opposition to said spring to release said brake-applying engagement when said electromagnet is energized and movable in the opposite direction under the influence of said spring when the electromagnet is deenergized, and means for controlling the movement of said core in said opposite direction to impose a periodically varying opposing force on the brake-applying force of said spring, said last-named means including an oscillatory inertia system carried by said core for movement therewith.

7. A brake including a brake drum, a brake shoe and a spring for normally forcing said shoe against said drum in brake-applying engagement, means including an electromagnet having a core movable in one direction for exerting a force in opposition to said spring to release said brake-applying engagement when said electromagnet is energized and movable in the opposite direction under the influence of said spring when the electromagnet is deenergized, and means for controlling the movement of said core in said opposite direction to impose a periodically varying opposing force on the brake-applying force of said spring, said last-named means including an oscillatory inertia system carried by said core for movement therewith, and means for damping the movement of said core.

8. A brake including a brake drum, a brake shoe and a spring for normally forcing said shoe against said drum in brake-applying engagement, means including an electromagnet having a core movable in one direction for exerting a force in opposition to said spring to release said brake-applying engagement when said electromagnet is energized and movable in the opposite direction under the influence of said spring when the electromagnet is deenergized, and means for controlling the movement of said core in said opposite direction to impose a periodically varying opposing force on the brake-applying force of said spring, said last-named means including an oscillatory inertia system carried by said core for movement therewith, and means for damping the movement of said core comprising resilient means opposing core movement in said opposite direction.

HARRY BERKOVITZ.

References Cited in the file of this patent

UNITED STATES PATENTS

| Number | Name | Date |
| --- | --- | --- |
| 1,231,590 | Friedlaender | July 3, 1917 |
| 1,532,138 | Hodgson | Apr. 7, 1925 |
| 1,577,999 | Atkinson | Mar. 23, 1926 |
| 1,902,640 | Halfvarson | Mar. 21, 1933 |

FOREIGN PATENTS

| Number | Country | Date |
| --- | --- | --- |
| 490,669 | Great Britain | Aug. 15, 1938 |